United States Patent [19]
Ichimi

[11] 4,199,757
[45] Apr. 22, 1980

[54] CHARACTER DISPLAY APPARATUS
[75] Inventor: Akira Ichimi, Ome, Japan
[73] Assignee: Tokyo Shibaura Electric Co., Ltd., Japan
[21] Appl. No.: 870,652
[22] Filed: Jan. 19, 1978
[30] Foreign Application Priority Data
  Jan. 21, 1977 [JP] Japan .................................. 52-5480
[51] Int. Cl.² ............................................ G06K 15/20
[52] U.S. Cl. ...................................... 340/750; 340/802
[58] Field of Search ................ 340/324 AD, 750, 802, 340/814

[56] References Cited
U.S. PATENT DOCUMENTS

| | | | |
|---|---|---|---|
| 3,444,319 | 5/1969 | Artzt et al. | 340/324 AD |
| 3,696,387 | 10/1972 | Nussbaum | 340/324 AD |
| 3,750,135 | 7/1973 | Carey et al. | 340/324 AD |
| 3,821,730 | 6/1974 | Carey et al. | 340/324 AD |
| 3,849,773 | 11/1974 | Katahira et al. | 340/324 AD |
| 4,041,482 | 8/1977 | Frendeberg et al. | 340/324 AD |

*Primary Examiner*—David L. Trafton
*Attorney, Agent, or Firm*—Finnegan, Henderson, Farabow, Garrett & Dunner

[57] ABSTRACT

A character display apparatus comprises a temporary memory unit for temporarily storing the internal data read out from a memory unit, a converting circuit for converting every given length of the internal data stored in the memory unit into numerical information, a display unit for displaying the numerical information delivered from the converting circuit in terms of an alphanumerical code in accordance with the contents of the numerical information.

3 Claims, 2 Drawing Figures

F I G. 1
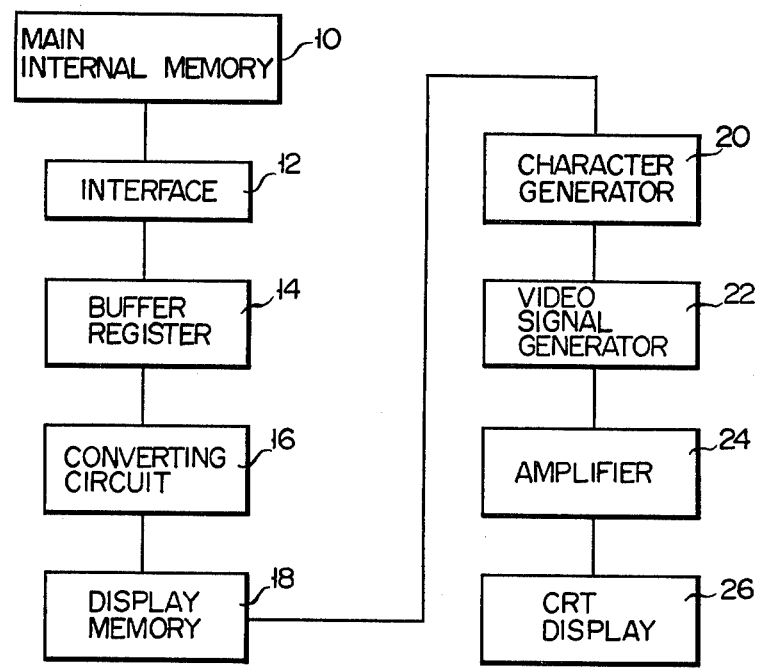
F I G. 2
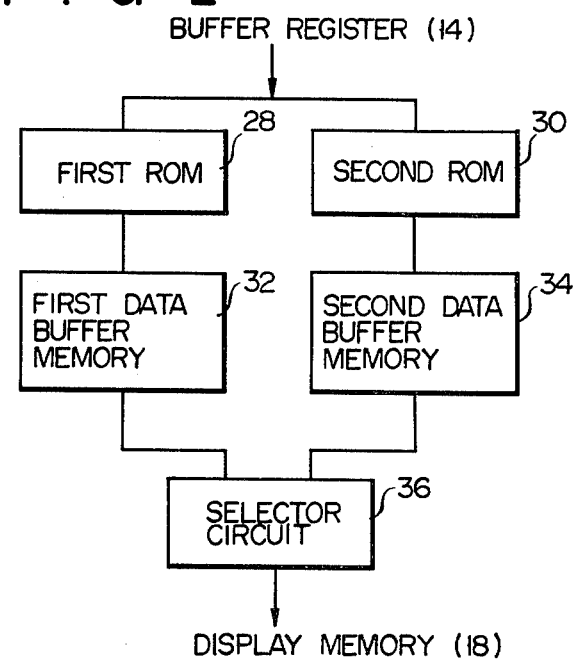

CHARACTER DISPLAY APPARATUS

BACKGROUND OF THE INVENTION

The present invention relates to a character display apparatus for displaying the internal data stored in a memory unit of an information processing system.

This apparatus is used mainly for checking the memory contents stored in the memory unit or whether its related units operate in a normal condition or not, and various types of such apparatus have been developed and practically used. One of them operates so as to depict bits constituting various hexadecimal codes read out from the memory unit with the corresponding special patterns. The check of the memory contents is made by recognizing these patterns. This conventional apparatus is defective in that it needs a special pattern generator to depict the special patterns on the display unit and that it requires a skill to correctly recognize the patterns.

SUMMARY OF THE INVENTION

Accordingly, an object of the present invention is to provide a character display apparatus by which the contents of a memory unit may be easily displayed in terms of an alphanumerical code and correctly checked without any special pattern generator and a special skill of an operator.

To achieve this object, the character display apparatus of this invention comprises a temporary memory unit for temporarily storing internal data read out from a memory unit; a converting circuit for converting every given length of the internal data supplied from the memory unit into numerical information; a display unit for displaying the numerical information delivered from the converting circuit in terms of an alphanumerical code in accordance with the contents of the numerical information.

In one of the preferred embodiments of this invention, the converting circuit comprises a plurality of ROMs receiving a plurality of numerical information signals respectively, each signal, produced by dividing the internal memory read out from the memory unit, having a predetermined number of bits; a plurality of buffer memories for temporarily storing the numerical information delivered from the ROMs; and a selector circuit for reading out the numerical information from the buffer memory in a given succession and feeding it to the display memory unit.

According to the character display apparatus, the contents of the memory unit are displayed on a display unit in the terms of an alphanumerical code. This eliminates the special skill of an operator for recognition and discrimination of the display.

Other objects and features of the present invention will be apparent from the following description taken in connection with the accompanying drawings, in which:

BRIEF DESCRIPTION OF THE DRAWING

FIG. 1 shows a block diagram of an embodiment of a character display apparatus in accordance with the present invention; and FIG. 2 shows a block diagram of a converting circuit of the circuit shown in FIG. 1.

DESCRIPTION OF THE PREFERRED EMBODIMENT

An embodiment of the present invention will be given with reference to FIGS. 1 and 2. In this embodiment internal data from a main memory unit is displayed on a display unit in terms of ASCII code (American Standard Code for Information Interchange Code). In the FIG. 1 reference numeral 10 is a main memory unit incorporated in an information processing system, and reference numeral 14 is a buffer register for temporarily storing internal data which is read out from the main memory unit 10 and comes therefrom through an interface 12. In the embodiment, each byte constructing the internal data consists of 8 bits, for example. A converting circuit 16 unpacks each byte of the internal data fed from the buffer register 14 into upper and lower informations. The upper and lower informations each consists of four bits. The converting circuit 16 also converts the upper and lower information into numerical information,, respectively, in accordance with ASCII code. In this case, each of the upper and lower information is converted into two units of numerical information. The converted numerical information uses four bits for one byte. Reference numeral 18 is a display memory unit for successively storing numerical information transferred from the converting circuit 16. A character generator 20 receives the numerical information read out from the display memory unit 18 and generates the character codes corresponding to the numerical information. A video signal generator 22 receives the character code and converts it into a video signal. The video signal is amplified by an amplifier 24 and then applied to a CRT display unit 26 where it is visualized. The display memory unit 18 and CRT display unit 26 are included in the display means of this embodiment.

FIG. 2 shows a preferred embodiment of the converting circuit 16. A first ROM 28 receives the upper information from the buffer register 14 and produces first character data. As mentioned above, the upper information is included in the internal data corresponding to the 7th to 4th bits of the internal data byte. The upper information is expressed in hexadecimal code, and the first character data includes a byte of two hexadecimal codes. The first ROM produces the first character data byte by byte. A second ROM 30 receives the lower information corresponding to the third to 0th bits of the internal data byte, and produces a second character byte by byte. One byte of the second character includes two hexadecimal codes. A first buffer memory 32 is used for temporarily storing the first character date or information from the first ROM, and a second data buffer 34 for temporarily storing the second character data or information from the second ROM. A selector circuit 36 successively selects the character information from the first and second data buffer memories 32 and 34 to transmit it to the display memory unit 18.

In operation, each byte (including 8 bits) of the internal data read out from the main memory unit 10 is loaded into the buffer register 14 through the interface 12. The internal data from the buffer register 14 is transferred into the converting circuit 16 where it is unpacked into the upper and the lower information. Each of the upper and lower information is converted into two units of hexadecimal code information as described above. The upper and lower information each consists of 4 bits and the converted hexadecimal code information consists of two units of 4 bits each.

A specific example to display an alphabet A on the CRT 26 will be given. The internal data "4, 1" corresponding to the character A is stored in the buffer register 14, and then applied to the converting circuit 16. In the converting circuit 16, the internal data "4, 1" is unpacked into the upper information "4" and the lower information "1". The upper information "4" is then loaded into the first ROM 28 where it is converted into the first character data consisting of two units of hexadecimal code information "3, 4", i.e. "0011;0100". As described above, the conversion is performed in accordance with the ASCII code. Similarly, the lower information "1" is loaded into the second ROM 30 where it is converted into two units of hexadecimal code information constituting the second character data "3, 1", i.e. "0011;0001". The first and second character data are loaded into the first and second buffer memories 32 and 34, respectively. The selector circuit 36 alternately reads out the first and second character data from the corresponding buffer memories. Firstly, the first character data "3, 4" is read out and secondly, the second character data "3, 1" is read out, for example. These character data from the selector circuit 36 are successively loaded into the display memory unit 18, and then transferred to the character generator 20. As described above the character generator 20 generates the character codes corresponding to the character data delivered thereinto. For example, for the first character data "3, 4", it produces a character code representing the numeral "4" corresponding to the first character data. Similarly, the character generator 20 produces a character code representing numeral "1" when it receives the second character "3, 1". The character codes thus produced are successively transferred to the CRT display 26, through the video signal generator 22 and the amplifier 24. In this manner the CRT displays numerals "4" and "1" in accordance with the ASCII code when the apparatus receives character A from the main memory of the information processing system. As a consequence, an operator is able to check directly and visually the internal data of the main memory 10, wherein each internal data is displayed in the hexadecimal notation using numeral characteristic 0-9 and/or alphabetic characteristic A-F.

In the above-described embodiment, the hexadecimal code is used, but any other coding system may be used for the present invention.

As described above, alphanumeric characters are displayed in the form of specific combinations of alphabetic and/or numerical characters without using a special pattern generator. Accordingly, the displayed image may be easily and distinctively recognized and checked by an operator not specially skilled.

What is claimed is:

1. A character display apparatus comprising: a temporary memory unit for temporarily storing internal data read out from a memory unit; a converting circuit for converting every given length of said internal data supplied from said memory unit into numerical information, said converting circuit including a plurality of ROMs for receiving information signals of the same number of bits produced by dividing said internal data sent from said memory unit and for producing said numerical information in terms of an alphanumerical code in accordance with said information signals, a plurality of buffer memories for temporarily storing said numerical information delivered from said ROMs and said converting circuit further comprising a selector circuit for reading out said numerical information from said buffer memory in a given succession; and a display unit for displaying said numerical information delivered from said converting circuit in terms of an alphanumerical code in accordance with the contents of said numerical information.

2. A character display apparatus comprising:
 a buffer register for temporarily storing internal data read out from a memory unit;
 a converting unit for dividing said internal data from said buffer register into two information signals each having a predetermined length and for producing numerical information by combining alphabetical codes, alphabetical codes and numerical codes, or numerical codes according to the contents of said information signals;
 a display memory for successively storing numerical information from said converting unit;
 a character generator for generating character codes corresponding to said numerical information read out from said display memory;
 a video signal generator for converting said character codes into video signals; and
 a cathode ray tube for displaying said character codes according to said video signals from said video signal generator.

3. A character display apparatus comprising:
 a buffer register for temporarily storing internal data read out from a memory unit;
 a converting unit for dividing said internal data from said buffer register into two information signals each having a predetermined length and for producing numerical information by combining alphabetical codes, alphabetical codes and numerical codes, or numerical codes according to the contents of said information signals, said converting unit comprising a plurality of ROMs for receiving information signals of the same number of bits produced by dividing said internal data from said memory unit and for producing said numerical information in accordance with said information signals; a plurality of buffer memories for temporarily storing said numerical information from said ROMs; and a selector circuit for reading out said numerical information from said buffer memory in a given succession and feeding said numerical information to said display unit;
 a display memory for successively storing numerical information from said converting unit;
 a character generator for generating character codes corresponding to said numerical information read out from said display memory;
 a video signal generator for converting said character codes into video signals; and
 a cathode ray tube for displaying the character codes according to the video signals from said video signal generator.

* * * * *